US012602582B2

(12) United States Patent
Kayi et al.

(10) Patent No.: US 12,602,582 B2
(45) Date of Patent: Apr. 14, 2026

(54) DYNAMIC DISTRIBUTED TRAINING OF MACHINE LEARNING MODELS

(71) Applicant: International Business Machines Corporation, Armonk, NY (US)

(72) Inventors: Abdullah Kayi, Westchester, NY (US); Wei Zhang, Elmsford, NY (US); Xiaodong Cui, Chappaqua, NY (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 17/226,399

(22) Filed: Apr. 9, 2021

(65) Prior Publication Data

US 2022/0327374 A1     Oct. 13, 2022

(51) Int. Cl.
| | |
|---|---|
| *G06N 3/08* | (2023.01) |
| *G06F 18/25* | (2023.01) |
| *H04L 67/10* | (2022.01) |

(52) U.S. Cl.
CPC ............. *G06N 3/08* (2013.01); *G06F 18/251* (2023.01); *H04L 67/10* (2013.01)

(58) Field of Classification Search
CPC .......... G06N 3/08; G06N 3/044; G06N 3/045; G06N 3/047; G06N 3/063
See application file for complete search history.

(56) References Cited

U.S. PATENT DOCUMENTS

| | | | |
|---|---|---|---|
| 10,019,470 B2 | 7/2018 | Birdwell | |
| 10,735,905 B2 | 8/2020 | Gross | |
| 10,878,314 B2 | 12/2020 | Nagaraja | |
| 2018/0293493 A1* | 10/2018 | Kalamkar | .............. G06N 3/063 |

OTHER PUBLICATIONS

Authors: Zhao et al. Title: Dynamic Stale Synchronous Parallel Distributed Training for Deep Learning Date: Aug. 16, 2019 (Year: 2019).*
Authors: Chahal et al. Title: A Hitchhiker's Guide On Distributed Training of Deep Neural Networks Date: Oct. 28, 2018 (Year: 2018).*
Authors: Xie et al Title: SYNC or ASYNC: Time to Fuse for Distributed Graph-Parallel Computation Published: Jan. 24, 2015 (Year: 2015).*

(Continued)

*Primary Examiner* — David Yi
*Assistant Examiner* — Amy Tran
(74) *Attorney, Agent, or Firm* — Michael A. Petrocelli

(57) ABSTRACT

Computer hardware and/or software that performs the following operations: (i) updating a machine learning model by synchronously applying, to the machine learning model, a first set of training results received from a set of trainers having respective training datasets; (ii) receiving, from one or more trainers of the set of trainers, a first set of metrics pertaining to at least some of the training results of the first set of training results; and (iii) based, at least in part, on the first set of metrics, determining to subsequently update the machine learning model via asynchronous application of subsequent training results received from respective trainers of the set of trainers.

20 Claims, 3 Drawing Sheets

(56) References Cited

OTHER PUBLICATIONS

Title: A Method and System for Minimizing Time for Switching between Synchronous and Asynchronous Mirroring of Storage Devices Authors: Authors et al Published: Feb. 25, 2014 (Year: 2014).*

Alvi et al., "Asynchronous Batch Bayesian Optimisation with Improved Local Penalisation", Proceedings of the 36th International Conference on Machine Learning, Long Beach, California, PMLR 97, 2019, Copyright 2019 by the author(s), 10 pages.

Authors et al.: Disclosed Anonymously, "A Method and System for Minimizing Time for Switching between Synchronous and Asynchronous Mirroring of Storage Devices", An IP.com Prior Art Database Technical Disclosure, IP.com No. IPCOM000235025D, IP.com Electronic Publication Date: Feb. 25, 2014, 3 pages.

Authors et al.: Disclosed Anonymously, "Method and System for Dynamic Loading of Neural Network Models", An IP.com Prior Art Database Technical Disclosure, IP.com No. IPCOM000260718D, IP.com Electronic Publication Date: Dec. 17, 2019, 3 pages.

DeVille et al., "Synchrony and asynchrony in a fully stochastic neural network*", Feb. 14, 2008, (*To appear in Bulletin of Mathematical Biology, accepted Feb. 14, 2008), 21 pages.

Nikolaidis et al., "LEARNAE: Distributed and Resilient Deep Neural Network Training for Heterogeneous Peer to Peer Topologies", Published in EANN 2019, 15 pages, DOI:10.1007/978-3-030-20257-6_24.

* cited by examiner

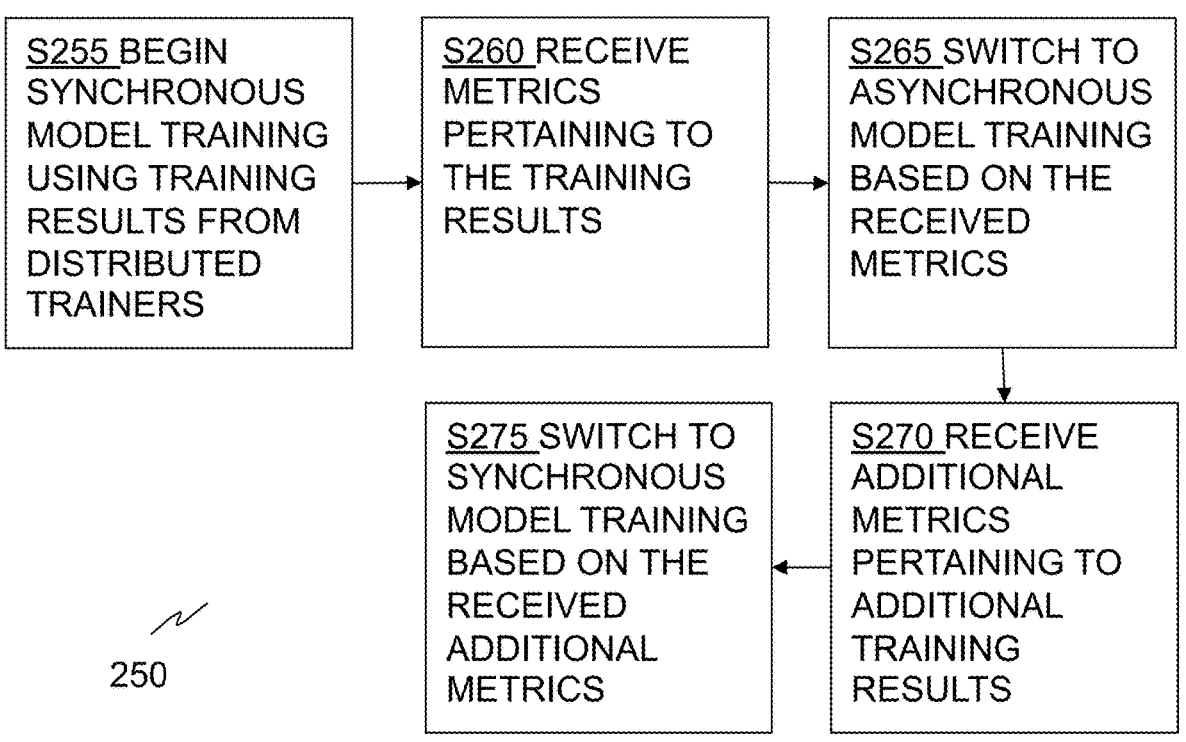

S255 BEGIN SYNCHRONOUS MODEL TRAINING USING TRAINING RESULTS FROM DISTRIBUTED TRAINERS

S260 RECEIVE METRICS PERTAINING TO THE TRAINING RESULTS

S265 SWITCH TO ASYNCHRONOUS MODEL TRAINING BASED ON THE RECEIVED METRICS

S275 SWITCH TO SYNCHRONOUS MODEL TRAINING BASED ON THE RECEIVED ADDITIONAL METRICS

S270 RECEIVE ADDITIONAL METRICS PERTAINING TO ADDITIONAL TRAINING RESULTS

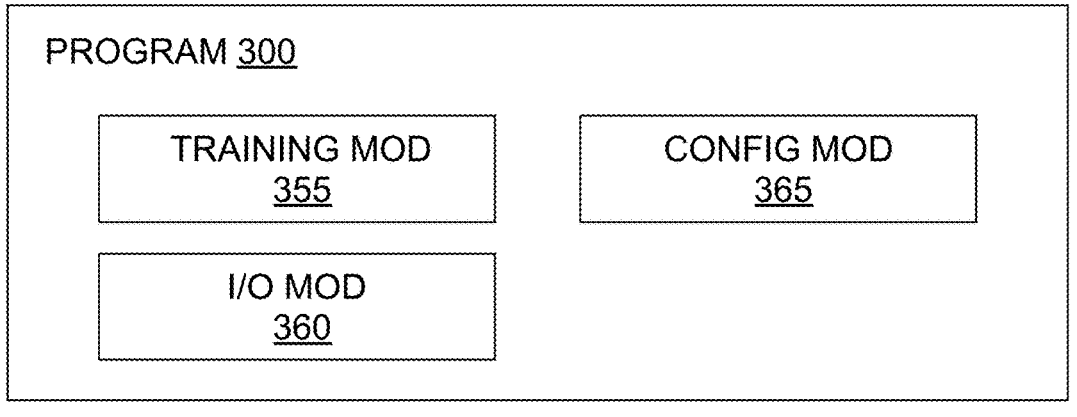

PROGRAM 300

TRAINING MOD 355

CONFIG MOD 365

I/O MOD 360

DYNAMIC DISTRIBUTED TRAINING OF MACHINE LEARNING MODELS

BACKGROUND

The present invention relates generally to the field of machine learning and more particularly to the distributed training of machine learning models.

Broadly speaking, machine learning involves computer algorithms (or "models") that automatically improve based on training data. Deep learning is a subset of machine learning that utilizes machine learning models called artificial neural networks that are generally inspired by biological neural networks in the brain. In some cases, the workload of training of a machine learning model such as an artificial neural network is split up and shared among multiple devices, which work in parallel to speed up the training, in a process generally referred to as distributed training.

Distributed training can generally be performed in either a synchronous mode or an asynchronous mode, each having its own advantages and disadvantages. For example, while synchronous training typically results in model convergence, it is not necessarily time efficient, as the entire training process can be slowed down by a single slow trainer. And while asynchronous training is generally more time efficient than synchronous training, it can result in lower training accuracy, which may affect a model's performance and/or ability to reach convergence. Thus, a solution that combines the advantages of both synchronous training and asynchronous training, while minimizing their respective disadvantages, is desired.

SUMMARY

According to an aspect of the present invention, there is a method, computer program product, and/or computer system that performs the following operations (not necessarily in the following order): (i) updating a machine learning model by synchronously applying, to the machine learning model, a first set of training results received from a set of trainers having respective training datasets; (ii) receiving, from one or more trainers of the set of trainers, a first set of metrics pertaining to at least some of the training results of the first set of training results; and (iii) based, at least in part, on the first set of metrics, determining to subsequently update the machine learning model via asynchronous application of subsequent training results received from respective trainers of the set of trainers. In doing so, the method, computer program product, and/or computer system advantageously combine various accuracy-related benefits of synchronous training with various time efficiency-related benefits of asynchronous training, while minimizing the respective disadvantages of both synchronous and asynchronous training.

According to an aspect of the present invention, the method, computer program product, and/or computer system advantageously update the machine learning model parameters utilized by the trainers of the set of trainers for subsequent asynchronous training. In particular, the method, computer program product, and/or computer system further generate a first updated set of machine learning model parameters based, at least in part, on the synchronous application, to the machine learning model, of the first set of training results, and communicate the first updated set of machine learning model parameters to the set of trainers, resulting in at least a first trainer of the set of trainers producing a second set of training results, and at least a second trainer of the set of trainers producing a third set of training results, based, at least in part, on the first updated set of machine learning model parameters.

According to an aspect of the present invention, the method, computer program product, and/or computer system advantageously apply the training results of respective trainers to the machine learning model in an asynchronous manner. In particular, the method, computer program product, and/or computer system further update the machine learning model by applying, to the machine learning model, at a first time, the second set of training results received from the first trainer, and by applying, to the machine learning model, at a second time, the third set of training results received from the second trainer.

According to an aspect of the present invention, the method, computer program product, and/or computer system advantageously switch back to synchronous training from asynchronous training to benefit from various accuracy-related benefits of synchronous training while avoiding various accuracy-related disadvantages of asynchronous training. In particular, the method, computer program product, and/or computer system further receive, from one or more trainers of the set of trainers, a second set of metrics pertaining to at least some training results of a second set of training results, and based, at least in part, on the second set of metrics, determine to subsequently update the machine learning model via synchronous application of subsequent training results received from the respective trainers of the set of trainers.

BRIEF DESCRIPTION OF THE DRAWINGS

FIG. 2 is a flowchart showing a first embodiment method performed, at least in part, by the first embodiment system;

FIG. 3 is a block diagram showing a machine logic (for example, software) portion of the first embodiment system.

DETAILED DESCRIPTION

Figure 1:
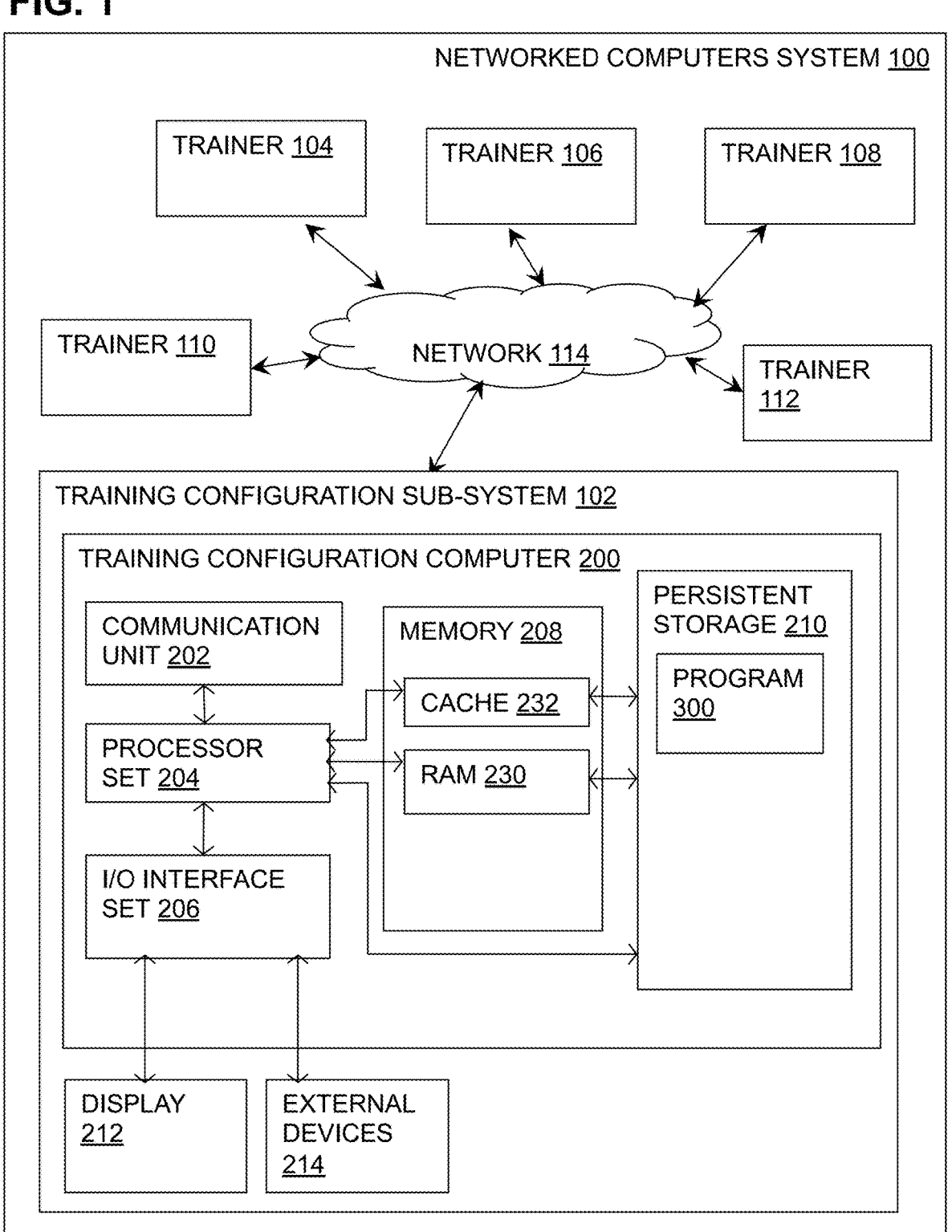
FIG. 1 is a block diagram view of a first embodiment of a system according to the present invention.

Distributed training of a machine learning model—with multiple trainers working essentially in parallel—typically takes place in either a synchronous mode, where training results from the trainers are collectively applied to the underlying model at approximately the same time, or in an asynchronous mode, where training results are individually applied to the underlying model as they are received. Embodiments of the present invention combine the advantages of both synchronous and asynchronous training, while minimizing their respective disadvantages, by automatically switching between a synchronous training mode and an asynchronous training mode based on various system metrics. In this way, as will be discussed in further detail below, various embodiments of the present invention improve upon conventional distributed training methods to utilize system resources in a way that is optimized for both model convergence and overall model performance.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: training configuration sub-system 102; trainer sub-systems 104, 106, 108, 110, 112; communication network 114; training configuration computer 200; communication unit 202; processor set 204; input/output (I/O)

interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with training configuration computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Generally speaking, in this example embodiment (also referred to in this sub-section as the "present embodiment," the "present example," the "present example embodiment," and the like), program 300 of training configuration computer 200 (also sometimes referred to as a "parameter server," see below) configures the training of a machine learning (ML) model by, amongst other things, distributing the training workload across several distributed trainers (i.e., trainers 104, 106, 108, 110, and 112). In this embodiment, the ML model is a deep artificial neural network configured to be trained in a data parallel approach, where training data is divided into multiple training datasets that are each sent by program 300 to a respective trainer (i.e., one of trainers 104, 106, 108, 110, and 112) along with a copy of the ML model. Each trainer trains its respective copy of the ML model using its respective training dataset and delivers corresponding training results to program 300 for training of the underlying ML model.

While the present example embodiment deals with data parallel training of an artificial neural network, it should be noted that in other embodiments, other types of distributed training and/or machine learning models may be used. For example, in various embodiments, a model parallel or pipeline model parallel approach is used, either alone or in combination with a data parallel approach. Further, in various embodiments, the ML model is a different type of deep learning model, such as a deep belief network, a recurrent neural network, a convolutional neural network, or the like, or a learning model based on classical, non-deep learning configurations. However, it should also be noted that these examples are not necessarily meant to be limiting, and that the ML model may be any type of model capable of being trained in a distributed way, with multiple trainers splitting up various components of a training workload, and where training results from the trainers are used in some fashion to ultimately train the underlying model.

The training of the ML model configured by program 300 generally has two separate "modes": (i) a synchronous training mode, and (ii) an asynchronous training mode. In the synchronous training mode, training results from the respective trainers are generally applied to the underlying ML model collectively, at approximately the same time, and the results of that collective application are then sent back out to all of the trainers for application to their respective copies of the ML model. In the asynchronous training mode, training results from the respective trainers are generally applied individually, at different times, with results of each application typically being sent out without waiting for the training results of other trainers to be completed. Several examples of synchronous and asynchronous training will be discussed over the course of the following paragraphs, as well as in the Further Comments and/or Embodiments sub-section of this Detailed Description, below. Furthermore, various embodiments of the present invention recognize that while in some embodiments, the entire set of trainers may be configured to operate in either synchronous training mode or asynchronous training mode, in other embodiments the synchronous training mode and asynchronous training mode may apply to subsets of the set of trainers, such that some trainers are operating in a synchronous mode and other trainers are operating in an asynchronous mode.

Processing begins at operation S255, where training module ("mod") 355 begins synchronously training the ML model using training results from distributed trainers. In this operation, program 300 has received training results from trainers 104, 106, 108, 110, and 112, and begins updating the ML model using those training results. The training results, generally speaking, are the product of the respective trainers training their respective copies of the ML model, and are indicative of the changes made to the respective copies of the ML during training (sometimes referred to as changes to the "parameters" of the ML model). For example, in the present example embodiment, where the ML model is a deep neural network having layers of nodes with respective weights (or parameters), the training results are simply a structured list of changes made to the respective weights (or parameters) of the nodes of the ML model during training. Some other examples of training results utilized by various embodiments of the present invention include gradients, gradient weights, and the like.

As mentioned above, in synchronous training, training results from the respective trainers are generally applied to the underlying ML model collectively, at approximately the same time. In the present example embodiment, the synchronous training of the ML model in operation S255 includes combining the respective training results from each trainer into a combined set of training results and applying the combined set of training results to the ML model in a single operation, resulting in an updated ML model. Other methods of synchronously applying training results to an ML model—now known or to be developed in the future—may also be used, either alone or in combination with the above.

Further, it should be noted that in the present example embodiment, and in various other embodiments of the present invention, the training results initially received from the trainers are only partial training results resulting from the processing of respective subsets, or "batches," of the respective training datasets for each trainer. For example, in a data parallel approach such as in the present example embodiment, training data for the underlying ML model is divided into multiple training datasets which are then sent to the various distributed trainers (e.g., trainers 104, 106, 108, 110, and 112) for training. As the trainers train their respective copies of the ML model using their respective training datasets, partial training results—corresponding to batches of the training datasets (usually having a predefined "batch size")—are produced. The partial training results are then sent to program 300 for application to the underlying ML model, and the trainers begin processing the next batch of their respective training datasets, often based on updated model parameters received from program 300.

Processing proceeds to operation S260, where I/O mod 360 receives metrics pertaining to the training results. Generally speaking, the metrics may include any information pertaining to the training results, including, but not limited to, information that may indicate a performance level or speed of the trainers in producing their respective training results. For example, in the present example embodiment, the metrics include the amount of time that it took for each trainer to produce that trainer's respective training results (i.e., a "computation time"). The metrics may also include a communication time—i.e., the amount of time it takes for the trainers to communicate their respective training results to I/O mod 360. Some other examples of metrics include metrics relating to training accuracy, training efficiency, health of the trainer, health of the computing system hosting the trainer, and/or the like. Furthermore, in some cases, the metrics are collected and sent to I/O mod 360 by the trainers themselves, either with their corresponding training results or separately, and in other cases, the metrics are collected by entities other than the trainers, such as by a dedicated analytics engine located on an analytics server in data communication with the various trainers.

Processing proceeds to operation S265, where config mod 365 switches the training of the ML model from synchronous to asynchronous based, at least in part, on the received metrics. For example, in the present example embodiment, if the metrics indicate that an amount of time taken by a first trainer to produce respective training results differs from (e.g., is more than), an amount of time taken by one or more other trainers to produce respective training results by at least a threshold amount of time (e.g., 25%), then config mod 365 determines to switch to an asynchronous training mode. As mentioned above, in asynchronous training, training results from the respective trainers are generally applied individually, at different times, with results of each application typically being sent out without waiting for the training results of other trainers to be completed. In the present embodiment, this allows the one or more other trainers to continue processing instead of waiting for the first trainer to complete its training.

In various embodiments, the trigger for switching between synchronous training and asynchronous training in operation S265 is time related. For example, based on computation time and/or communication time, is the amount of time that it takes for the first trainer to complete its training meaningfully higher than the amount of time that it takes for other trainers to complete their training? While the present example embodiment uses 25% as a threshold, it should be noted that 25% is only one example of an appropriate threshold, and that in other embodiments, any of a wide variety of thresholds may be used, including those known in the art and those yet to be developed in the future. Furthermore, the first trainer may be compared to the other trainers in any of a number of ways. For example, in some cases, the first trainer is compared to the next slowest trainer, and in some other cases, the first trainer is compared to the totality of the other trainers, using a measurement such as an average training time or a median training time for the comparison. Still further, in many cases, multiple measurements above a threshold may be required in order to trigger the switch between synchronous and asynchronous training, in order to ensure that the difference is persistent/consistent and not just a single outlier.

In many embodiments, including the present example embodiment, the training of the ML model continues until each batch of each training dataset has been processed. For example, after switching to asynchronous training mode in operation S265, training mod 355 updates the ML model each time training results are received from one of the trainers, such that training results received from a first trainer will be applied to the ML model at a first time and training results received from a second trainer will be applied to the ML model at a second time. Further, in many cases the synchronous application of the initial training results to the ML model results in an updated set of ML model parameters. In these cases, the updated parameters are sent to the trainers for applying to their respective copies of the ML model. As such, subsequent training results produced by the trainers—such as the training results received from the first trainer and the second trainer mentioned above—will be based on the updated set of ML model parameters. The subsequent training results and metrics corresponding to those subsequent training results can also be used to determine when to switch training from the asynchronous training mode back to the synchronous training mode, as will be discussed below.

Processing proceeds to operation S270, where I/O mod 360 receives additional metrics (i.e., a second set of metrics) pertaining to additional training results (i.e., a second set of training results) for the trainers. Processing of operation S270 occurs similarly to the processing of operation S260, with the primary difference being that while the metrics received in operation S260 generally relate to results of synchronous training, the metrics received in operation S270 generally relate to the results of asynchronous training. In some cases, the same types of metrics are collected in both operations S260 and S270, and in other cases, different types of metrics are collected. For example, in some cases, operations S260 and S270 both include computation time metrics, as mentioned above. However, in some cases, including in the present example embodiment, operation S270 may also collect metrics relating to ML model convergence, which will be discussed in further detail below.

Processing proceeds to operation S275, where config mod 365 switches the training of the ML model from asynchronous back to synchronous based, at least in part, on the received additional metrics. Generally speaking, the change from asynchronous mode back to synchronous mode is based on determining that the issue that caused the switch to asynchronous mode in operation S265—such as a particular trainer being slower than other trainers—has been resolved. For example, if the switch to asynchronous mode in operation S265 was based on a slow, or straggling, trainer, then the switch back to synchronous training would happen when the trainer is no longer straggling—e.g., when all trainers are reporting similar training times within a threshold distance. In the present example embodiment, for example, if the second set of metrics indicates that the amount of time taken by the first trainer to produce respective training results of the second set of training results differs from (e.g., is less than) the amount of time taken by the one or more other trainers to produce respective training results of the second set of training results by less than the threshold amount of time (e.g., 25%), then config mod 365 determines to switch back to the synchronous training mode.

Another factor that may contribute to the decision to switch from asynchronous training back to synchronous training is ML model convergence. Generally speaking, ML model convergence is the point during training where a loss function associated with the ML model falls within an error range of a desired value, such that additional training will be unlikely to improve the ML model further. Because convergence is more easily reached using synchronous training than using asynchronous training, config mod 365 may determine during asynchronous training to switch back to synchronous training to increase the likelihood that convergence is achieved, or to decrease the time it takes to reach convergence. This may occur, for example, if the second set of metrics indicates that an amount of difference between a current measure of model convergence and a desired measure of model convergence exceeds a threshold amount of difference and/or improves by less than a threshold amount of difference (e.g., over a time period or after a certain number of training iterations). Various thresholds may be utilized, including those known in the art and those yet to be developed in the future. In some cases, for example, the measure of model convergence is a loss value, which, as a goal, should be minimized as part of the training process. If, after a given amount of time or a given number of training iterations/epochs, the loss value has not decreased, then config mod 365 may determine to switch back to synchronous training. Another potential trigger for switching back to synchronous training could be if the loss value increases to above a predetermined maximum value.

III. Further Comments and/or Embodiments

Various embodiments of the present invention dynamically switch between a synchronous mode and an asynchronous mode for distributed training of a machine learning model.

Various embodiments of the present invention recognize that there are several approaches for performing distributed training of deep learning models, including a data parallel approach, a model parallel approach, and a pipeline model parallel approach, with the data parallel approach being a preferred approach in many cases. The data parallel approach can generally be divided into four categories, based on the following questions: (i) is there a central control point? (centralized or decentralized), and (ii) how does the execution flow work? (synchronous or asynchronous). In many cases, the centralized synchronous data parallel approach ends up being selected as the preferred option.

Various embodiments of the present invention recognize that a centralized synchronous data parallel ("CSDP") approach typically includes a central parameter server and one or more distributed learners, with the learners being replicas of the model being trained. In a CSDP training environment, a learner pulls a weight W from the parameter server, computes a gradient $\nabla$ W using the batch size, and pushes the gradient $\nabla$ W back to the parameter server. The parameter server waits until all of the gradients from each of the respective learners are received, aggregates the gradients, and updates the weight W based on the aggregated gradients.

Various embodiments of the present invention recognize that a centralized asynchronous data parallel ("CADP") approach also includes a central parameter server and one or more distributed learners. In a CADP training environment, a learner acts similar to a learner in a CSDP environment: the learner pulls the weight W from the parameter server, computes the gradient $\nabla$ W using the batch size, and pushes the gradient $\nabla$ W back to the parameter server. However, in the CADP environment, the parameter server updates the weight W as soon as there is a gradient $\nabla$ W received from a learner; in other words, the parameter server does not wait for all gradients to be received before applying a gradient $\nabla$ W to the weight W.

Various embodiments of the present invention recognize that while a CSDP approach may provide a guarantee of model convergence, it may not be time efficient, and may suffer from the straggler problem (i.e., one or more learners slowing down training for the entire system). Various embodiments also recognize that while a CADP approach may be more time efficient, with no straggler issues and automatic load balancing, it may suffer from a staleness problem, as gradients of slow learners may be computed from significantly mismatched weights, which may affect the ability to reach convergence and accordingly affect the performance of the model being trained.

Thus, various embodiments recognize a need for the advantages of both the CSDP approach and the CADP approach in a single solution, with the goal being to reach the best utilization of system resources based on model convergence and overall performance.

Accordingly, various embodiments of the present invention dynamically switch between synchronous and asynchronous modes of operation during distributed training of a neural network, monitoring computation time, communication time, and convergence to decide which mode to operate in. In various embodiments, the transition from synchronous mode to asynchronous mode relies on sensors to detect communication time and computation time as indicators of straggling learners. In various embodiments, the transition from asynchronous mode to synchronous mode relies on the resolution of the straggler problem as detected by the parameter server, and optionally on convergence measures.

Figure 4:
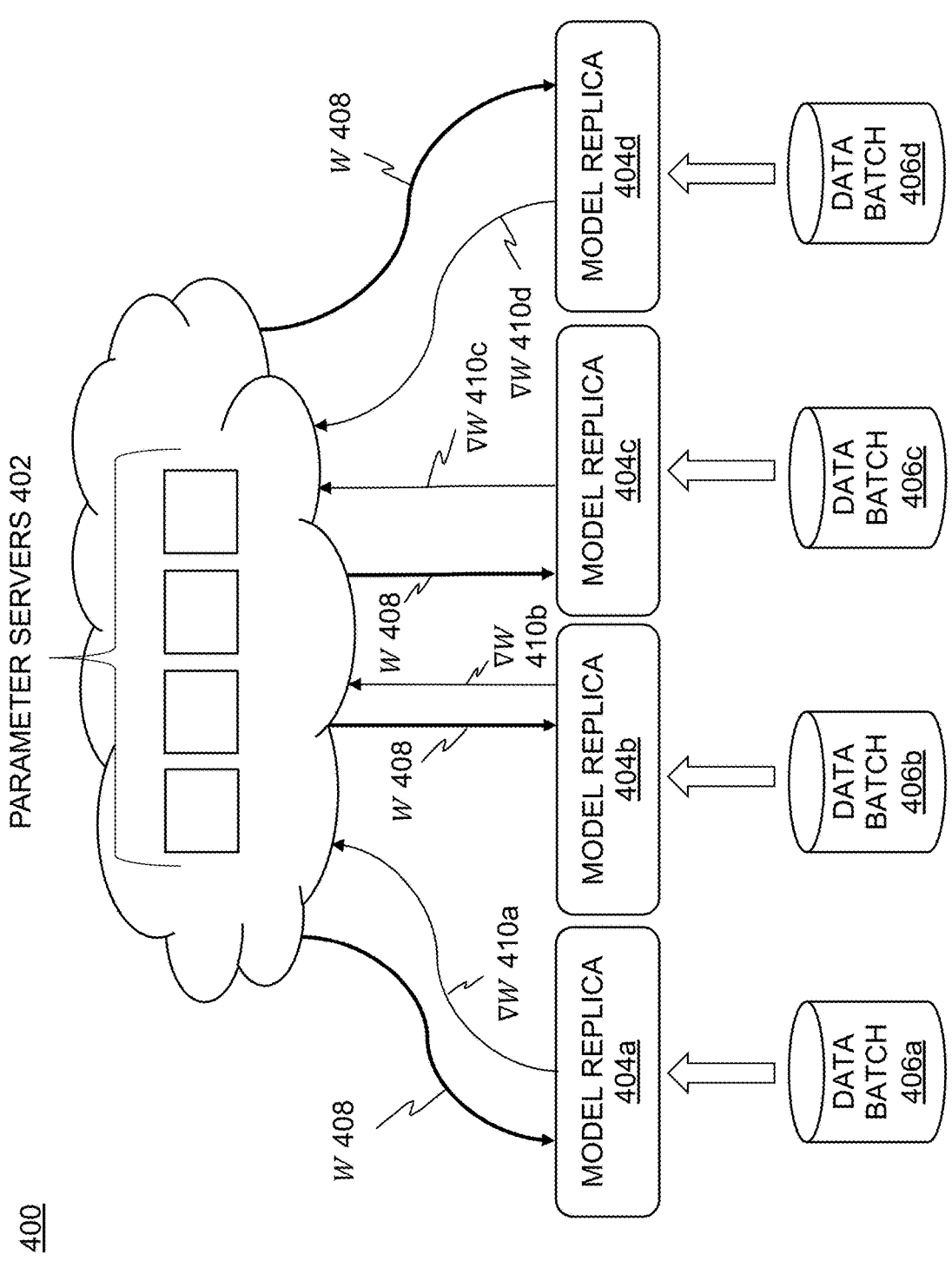
FIG. 4 is a block diagram showing a second embodiment of a system according to the present invention.

FIG. 4 is a block diagram showing a second embodiment of a system according to the present invention. As shown in FIG. 4, system 400 includes parameter servers 402; model replicas 404a, 404b, 404c, and 404d; data batches 406a, 406b, 406c, and 406d; weight W 408; and gradients $\nabla$ W 410a, $\nabla$ W 410b, $\nabla$ W410c, and $\nabla$ W 410d. As depicted, parameter servers 402 send weight W 408 to each of model replicas 404a, 404b, 404c, and 404d, and model replicas 404a, 404b, 404c, and 404d utilize weight W 408 to train themselves (i.e., their respective model replicas) using data batches 406a, 406b, 406c, and 406d, respectively. As a result of the training, each of model replicas 404a, 404b, 404c, and 404d produces gradients (i.e., weight adjustments) from their training—gradients $\nabla$ W410a, $\nabla$ W 410b, $\nabla$ W 410c, and $\nabla$ W 410d, respectively—and sends those gradients back to parameter servers 402 for applying to weight W 408 (i.e., the overall weight for the model).

In the embodiment depicted in FIG. 4, model replicas 404a, 404b, 404c, and 404d are replicas of a deep neural network, and as such model replicas 404a, 404b, 404c, and 404d include the various features and architecture layers of a deep neural network, including activation functions (e.g., non-linear functions such sigmoid functions, rectified linear unit (relu) functions, and hyperbolic tangent (tan h) functions) and fully-connected layers. In other embodiments, other configurations may be used, including configurations now known in the art and/or those yet to be developed in the future.

In the embodiment depicted in FIG. 4, a first sense component (not shown) detects stragglers among the learners (i.e., model replicas 404a, 404b, 404c, and 404d) of system 400 for the purpose of determining when to switch from synchronous mode to asynchronous mode. In particular, the detection by the first sense component begins with each learner (i.e., model replicas 404a, 404b, 404c, and 404d) timing itself in the processing of the learner's data batch (i.e., data batches 406a, 406b, 406c, and 406d, respectively), and sending the resulting batch execution time to parameter servers 402 as metadata along with the learner's gradient (i.e., gradients $\nabla$ W 410a, $\nabla$ W 410b, $\nabla$ W 410c, and $\nabla$ W 410d, respectively). Parameter servers 402 collect the local batch execution times from the learners and sort the batch execution times in a table to detect potential stragglers. In some embodiments, the first sense component is a hardware and/or software module located, for example, on parameter servers 402, which stores the batch execution times for the learners and accordingly processes the batch execution times to detect stragglers. In other embodiments, the actions performed by the first sense component are performed by various different hardware and/or software modules of system 400.

Continuing with the embodiment depicted in FIG. 4, a second sense component (not shown) detects the resolution of the straggler learners, for the purpose of determining when to switch from asynchronous to synchronous mode. In particular, the second sense component begins with the same data collection on the learner side as the first sense component: each learner (i.e., model replicas 404a, 404b, 404c, and 404d) times itself in the processing of the learner's data batch (i.e., data batches 406a, 406b, 406c, and 406d, respectively), and sends the resulting batch execution time to parameter servers 402 as metadata along with the learner's gradient (i.e., gradients $\nabla$ W 410a, $\nabla$ W 410b, $\nabla$ W410c, and $\nabla$ W 410d, respectively). Then, parameter servers 402 collect the local batch execution times, sort the results in the table, compare straggler performance with the performance of non-straggling learners, and determine whether there is still a straggler issue. If no stragglers are detected, it is considered safe to switch back to synchronous mode. In some embodiments, the second sense component is a hardware and/or software module located, for example, on parameter servers 402, which keeps track of the learner batch execution times and accordingly processes the batch execution times to detect the resolution of the straggler problem. In other embodiments, the actions performed by the second sense component are performed by various different hardware and/or software modules of system 400.

Continuing still with the embodiment depicted in FIG. 4, an actuate component (not shown) uses the information collected by the first sense component and the second sense component to determine when to switch between synchronous and asynchronous training modes. The actuate component begins by setting the default/initial distributed training mode with parameter servers 402 to centralized synchronous. Then, as the first sense component detects a straggler issue, parameter servers 402 start serving learners in an asynchronous manner until a resolution of the straggler issue is detected using information collected by the second sense component. Generally speaking, the actuate component tries to stay in synchronous centralized mode as much as possible to guarantee convergence, and only switches to asynchronous mode to alleviate the straggler issue. In some cases, parameter servers 402 also perform model checkpoints as a fallback mechanism before the transitions between modes. In other words, prior to the transition from synchronous to asynchronous, or from asynchronous to synchronous, parameter servers 402 may back up each of model replicas 404a, 404b, 404c, and 404d—or of the original model used to create the model replicas—in case future changes end up needing to be reverted. The backup models may be stored on the same devices/servers as model replicas 404a, 404b, 404c, and 404d, on parameter servers 402, or elsewhere.

Various embodiments of the present invention provide a method of using a computing device to train a neural network in both a synchronous mode and an asynchronous mode. The method includes training, by a computing device, in conjunction with a plurality of other computing devices, a neural network in a synchronous mode, synchronously across the plurality of other computing devices. The method further includes detecting by the computing device whether one of more of the plurality of other computing devices in the neural network is training the neural network, and changing by the computing device one or more of the plurality of other computing devices in the neural network to an asynchronous mode to continue training the neural network.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:

updating, by one or more processors, a machine learning model by synchronously applying, to the machine learning model, a first set of training results received at a sub-system from a set of trainers having respective training datasets, as synchronous training;

receiving at the sub-system, by one or more processors, from one or more trainers of the set of trainers, a first set of metrics pertaining to at least some of the training results of the first set of training results;

based, at least in part, on the first set of metrics, determining, by one or more processors on a configuration computer communicating with the sub-system, to subsequently update the machine learning model via asynchronous application of subsequent training results received from respective trainers of the set of trainers;

in response to the first set of metrics indicating that an amount of time taken by a first trainer of the set of trainers to produce respective training results differs from an amount of time taken by one or more other trainers to produce respective training results by at least a threshold amount of time, switching, using the configuration computer, to an asynchronous training mode, the switching to the asynchronous training mode being based on the first trainer being a slow trainer; and

switching back to the synchronous training, using the configuration computer, when the slow trainer is no longer the slow trainer when all the one or more trainers of the set of trainers report similar training times within a threshold distance.

2. The computer-implemented method of claim 1, further comprising:

updating, by one or more processors, the machine learning model by applying, to the machine learning model, at a first time, a second set of training results received from a first trainer of the set of trainers; and updating, by one or more processors, the machine learning model by applying, to the machine learning model, at a second time, a third set of training results received from a second trainer of the set of trainers.

3. The computer-implemented method of claim 2, further comprising:

generating, by one or more processors, a first updated set of machine learning model parameters based, at least in part, on the synchronous application, to the machine learning model, of the first set of training results; and communicating, by one or more processors, the first updated set of machine learning model parameters to the set of trainers, wherein the second set of training results and the third set of training results are based, at least in part, on the first updated set of machine learning model parameters.

4. The computer-implemented method of claim 1, further comprising:

receiving, by one or more processors, from one or more trainers of the set of trainers, a second set of metrics pertaining to at least some training results of a second set of training results; and based, at least in part, on the second set of metrics, determining, by one or more processors, to subsequently update the machine learning model via synchronous application of subsequent training results received from the respective trainers of the set of trainers.

5. The computer-implemented method of claim 4, further comprising:

receiving, by one or more processors, respective training results from each trainer of the set of trainers;

combining, by one or more processors, the respective training results from each trainer of the set of trainers into a third set of training results; and updating, by one or more processors, the machine learning model by synchronously applying, to the machine learning model, the third set of training results.

6. The computer-implemented method of claim 4, wherein the first set of metrics indicates that an amount of time taken by a first trainer of the set of trainers to produce respective training results of the first set of training results differs from an amount of time taken by one or more other trainers of the set of trainers to produce respective training results of the first set of training results by at least a threshold amount of time.

7. The computer-implemented method of claim 6, wherein the second set of metrics indicates that an amount of time taken by the first trainer to produce respective training results of the second set of training results differs from an amount of time taken by the one or more other trainers to produce respective training results of the second set of training results by less than the threshold amount of time.

8. The computer-implemented method of claim 6, wherein the second set of metrics indicates that an amount of difference between a current measure of machine learning model convergence and a desired measure of machine learning model convergence exceeds a threshold amount of difference.

9. The computer-implemented method of claim 1, further comprising:

configuring, by one or more processors, the set of trainers for training by sending an initial copy of the machine learning model to each trainer of the set of trainers.

10. The computer-implemented method of claim 1, wherein the first set of training results includes respective machine learning model gradients for each trainer of the set of trainers.

11. A computer program product comprising one or more computer readable storage media and program instructions collectively stored on the one or more computer readable storage media, the program instructions executable by one or more processors to cause the one or more processors to perform a method comprising:

updating a machine learning model by synchronously applying, to the machine learning model, a first set of training results received at a sub-system from a set of trainers having respective training datasets, as synchronous training;

receiving, at the sub-system, from one or more trainers of the set of trainers, a first set of metrics pertaining to at least some of the training results of the first set of training results;

based, at least in part, on the first set of metrics, determining on a configuration computer communicating with the sub-system to subsequently update the machine learning model via asynchronous application of subsequent training results received from respective trainers of the set of trainers;

in response to the first set of metrics indicating that an amount of time taken by a first trainer of the set of trainers to produce respective training results differs from an amount of time taken by one or more other trainers to produce respective training results by at least a threshold amount of time, switching, using the configuration computer, to an asynchronous training mode, the switching to the asynchronous training mode being based on the first trainer being a slow trainer; and switching back to the synchronous training, using the configuration computer, when the slow trainer is no longer the slow trainer when all the one or more trainers of the set of trainers report similar training times within a threshold distance.

12. The computer program product of claim 11, the method further comprising:

updating the machine learning model by applying, to the machine learning model, at a first time, a second set of training results received from a first trainer of the set of trainers; and updating the machine learning model by applying, to the machine learning model, at a second time, a third set of training results received from a second trainer of the set of trainers.

13. The computer program product of claim 12, the method further comprising:

generating a first updated set of machine learning model parameters based, at least in part, on the synchronous application, to the machine learning model, of the first set of training results; and communicating the first updated set of machine learning model parameters to the set of trainers, wherein the second set of training results and the third set of training results are based, at least in part, on the first updated set of machine learning model parameters.

14. The computer program product of claim 11, the method further comprising:

receiving, from one or more trainers of the set of trainers, a second set of metrics pertaining to at least some training results of a second set of training results; and based, at least in part, on the second set of metrics, determining to subsequently update the machine learning model via synchronous application of subsequent training results received from the respective trainers of the set of trainers.

15. The computer program product of claim 14, the method further comprising:

receiving respective training results from each trainer of the set of trainers;

combining the respective training results from each trainer of the set of trainers into a third set of training results; and updating the machine learning model by synchronously applying, to the machine learning model, the third set of training results.

16. A computer system comprising:

one or more processors; and one or more computer readable storage media;

wherein:

the one are more processors are structured, located, connected and/or programmed to execute program instructions collectively stored on the one or more computer readable storage media; and the program instructions, when executed by the one or more processors, cause the one or more processors to perform a method comprising:

updating a machine learning model by synchronously applying, to the machine learning model, a first set of training results received at a sub-system from a set of trainers having respective training datasets, as synchronous training;

receiving at the sub-system, from one or more trainers of the set of trainers, a first set of metrics pertaining to at least some of the training results of the first set of training results;

based, at least in part, on the first set of metrics, determining on a configuration computer communicating with the sub-system, to subsequently update the machine learning model via asynchronous application of subsequent training results received from respective trainers of the set of trainers;

in response to the first set of metrics indicating that an amount of time taken by a first trainer of the set of trainers to produce respective training results differs from an amount of time taken by one or more other trainers to produce respective training results by at least a threshold amount of time, switching, using the configuration computer, to an asynchronous training mode, the switching to the asynchronous training mode being based on the first trainer being a slow trainer; and switching back to the synchronous training, using the configuration computer, when the slow trainer is no longer the slow trainer when all the one or more trainers of the set of trainers report similar training times within a threshold distance.

17. The computer system of claim 16, the method further comprising:

updating the machine learning model by applying, to the machine learning model, at a first time, a second set of training results received from a first trainer of the set of trainers; and updating the machine learning model by applying, to the machine learning model, at a second time, a third set of training results received from a second trainer of the set of trainers.

18. The computer system of claim 17, the method further comprising:

generating a first updated set of machine learning model parameters based, at least in part, on the synchronous application, to the machine learning model, of the first set of training results; and communicating the first updated set of machine learning model parameters to the set of trainers, wherein the second set of training results and the third set of training results are based, at least in part, on the first updated set of machine learning model parameters.

19. The computer system of claim 16, the method further comprising:

receiving, from one or more trainers of the set of trainers, a second set of metrics pertaining to at least some training results of a second set of training results; and based, at least in part, on the second set of metrics, determining to subsequently update the machine learning model via synchronous application of subsequent training results received from the respective trainers of the set of trainers.

20. The computer system of claim 19, the method further comprising:

receiving respective training results from each trainer of the set of trainers;

combining the respective training results from each trainer of the set of trainers into a third set of training results; and updating the machine learning model by synchronously applying, to the machine learning model, the third set of training results.

* * * * *